(No Model.) 5 Sheets—Sheet 1.
G. VAN WAGENEN.
MACHINE FOR DUMPING SUGAR WAGONS, &c.
No. 537,873. Patented Apr. 23, 1895.

WITNESSES:
INVENTOR
George Van Wagenen,
BY
Chas. C. Gill
ATTORNEY.

(No Model.) 5 Sheets—Sheet 2.

G. VAN WAGENEN.
MACHINE FOR DUMPING SUGAR WAGONS, &c.

No. 537,873. Patented Apr. 23, 1895.

WITNESSES:
Gustave Dieterich.
John Kehlenbeck.

INVENTOR
George Van Wagenen,
BY
Chas. O. Gill
ATTORNEY.

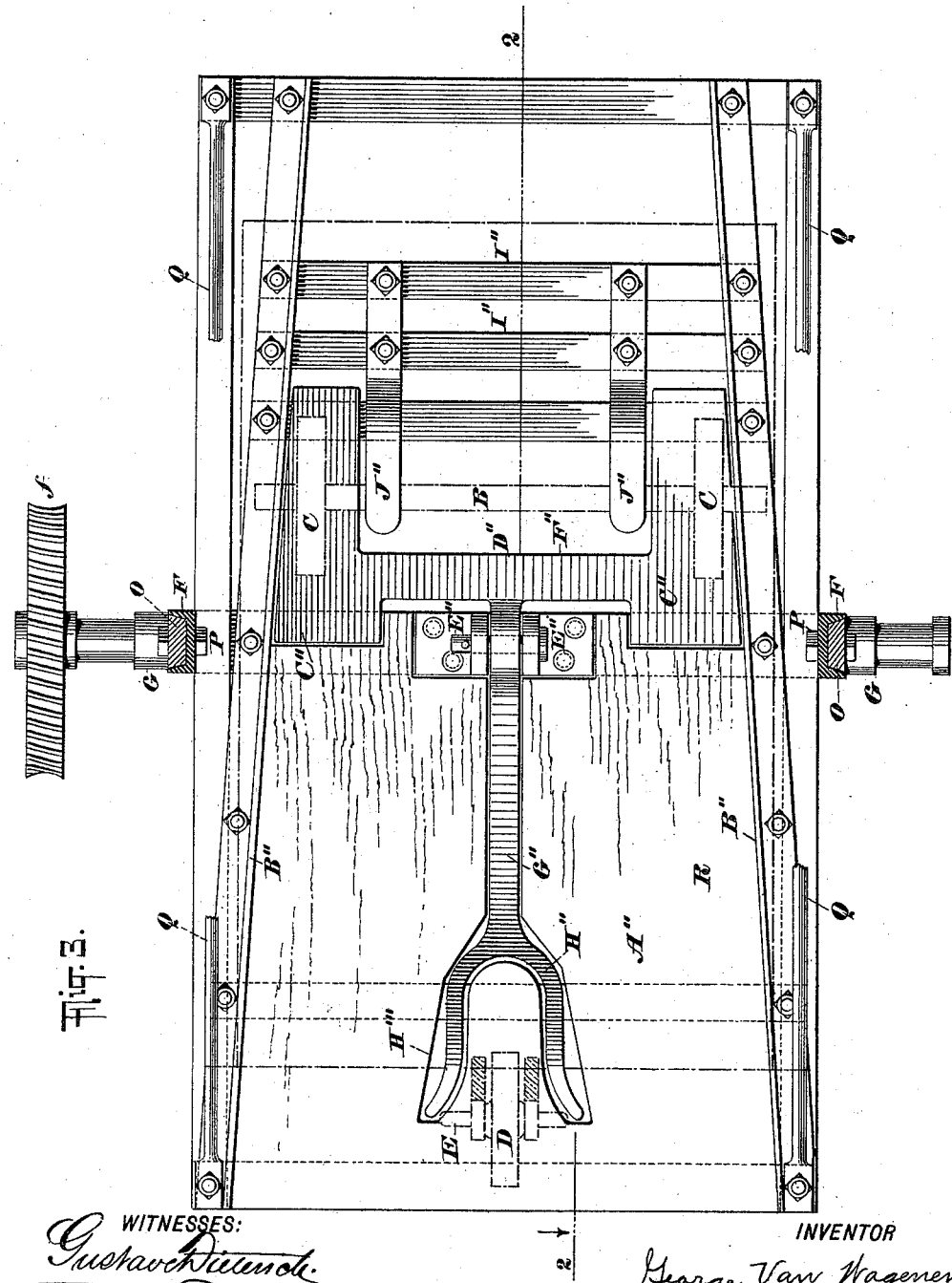

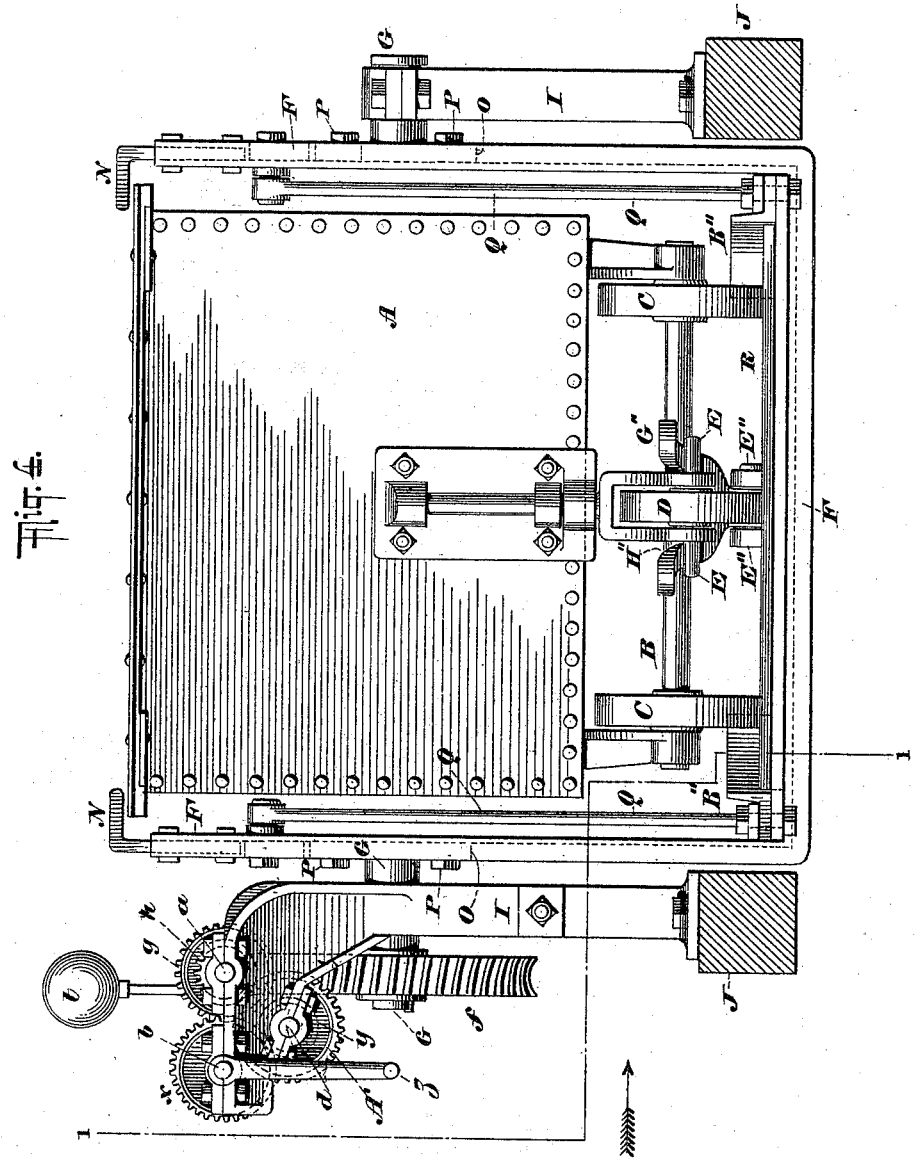

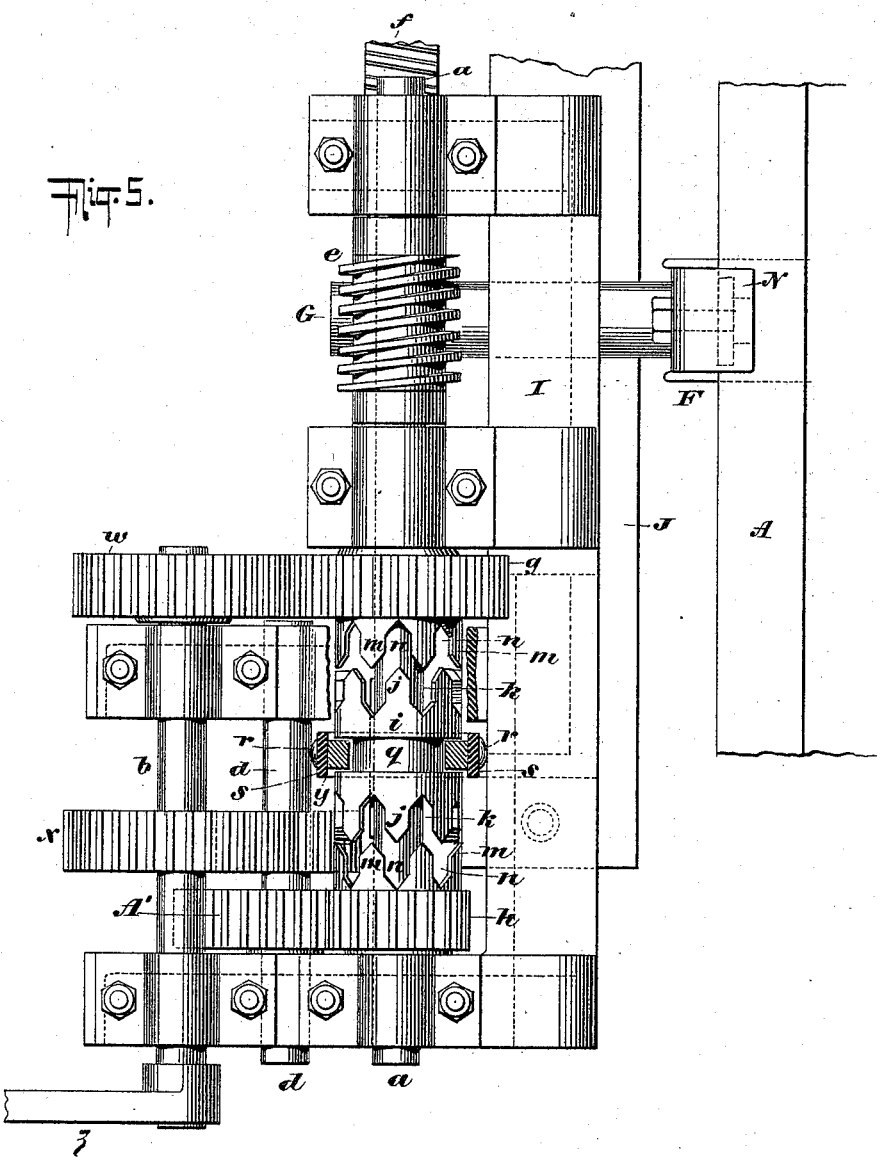

UNITED STATES PATENT OFFICE.

GEORGE VAN WAGENEN, OF NEW YORK, N. Y.

MACHINE FOR DUMPING SUGAR-WAGONS, &c.

SPECIFICATION forming part of Letters Patent No. 537,873, dated April 23, 1895.

Application filed February 9, 1895. Serial No. 537,751. (No model.)

*To all whom it may concern:*

Be it known that I, GEORGE VAN WAGENEN, a citizen of the United States, and a resident of New York, in the county of New York and State of New York, have invented certain new and useful Improvements in Machines for Dumping Sugar-Wagons and other Receptacles, of which the following is a specification.

The invention relates to improvements in machines for dumping sugar wagons and other receptacles, and consists in the novel features of construction and combinations of parts hereinafter described and particularly pointed out in the claims.

In the accompanying drawings I have illustrated the dumping machine made the subject hereof in connection with a sugar wagon of the kind shown and described in Letters Patent of the United States No. 441,264, granted to me on the 25th day of November, 1890. It is well known that the sugar is placed in these wagons while hot and in them allowed to cool and that thereafter the wagons are moved to the place at which it is desired to dump the sugar.

My present invention pertains particularly to a machine which will receive the wagons and reverse them in position to dump their contents, and then return them to their former position preparatory to their being moved away.

The present invention or machine is particularly designed for the dumping of what are known as swivel wagons, the latter having two wheels at one end and a swivel wheel at the other end. These wagons have usually been difficult to dump owing to the fact that they do not run on tracks and have the swivel wheel at one end.

In accordance with my present invention the swivel wheel wagon is run upon the platform of the machine herein claimed and said platform firmly holding the wagon reversed to discharge the sugar and then returned to its initial position, when the wagon is removed.

The construction and operation of the said dumping machine will appear in the detailed description hereinafter presented, reference being had to the accompanying drawings, in which—

Figure 1:
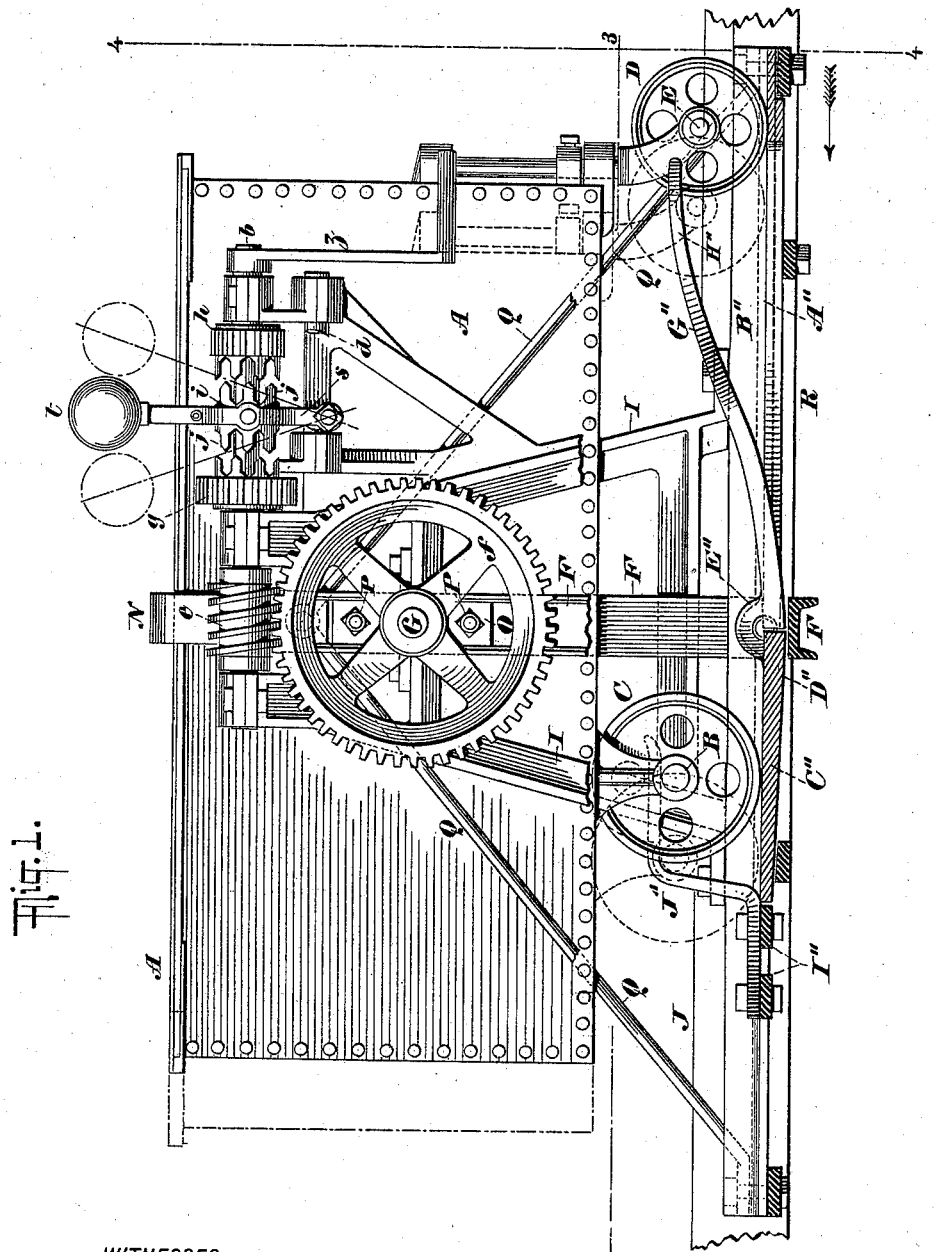
Figure 2:
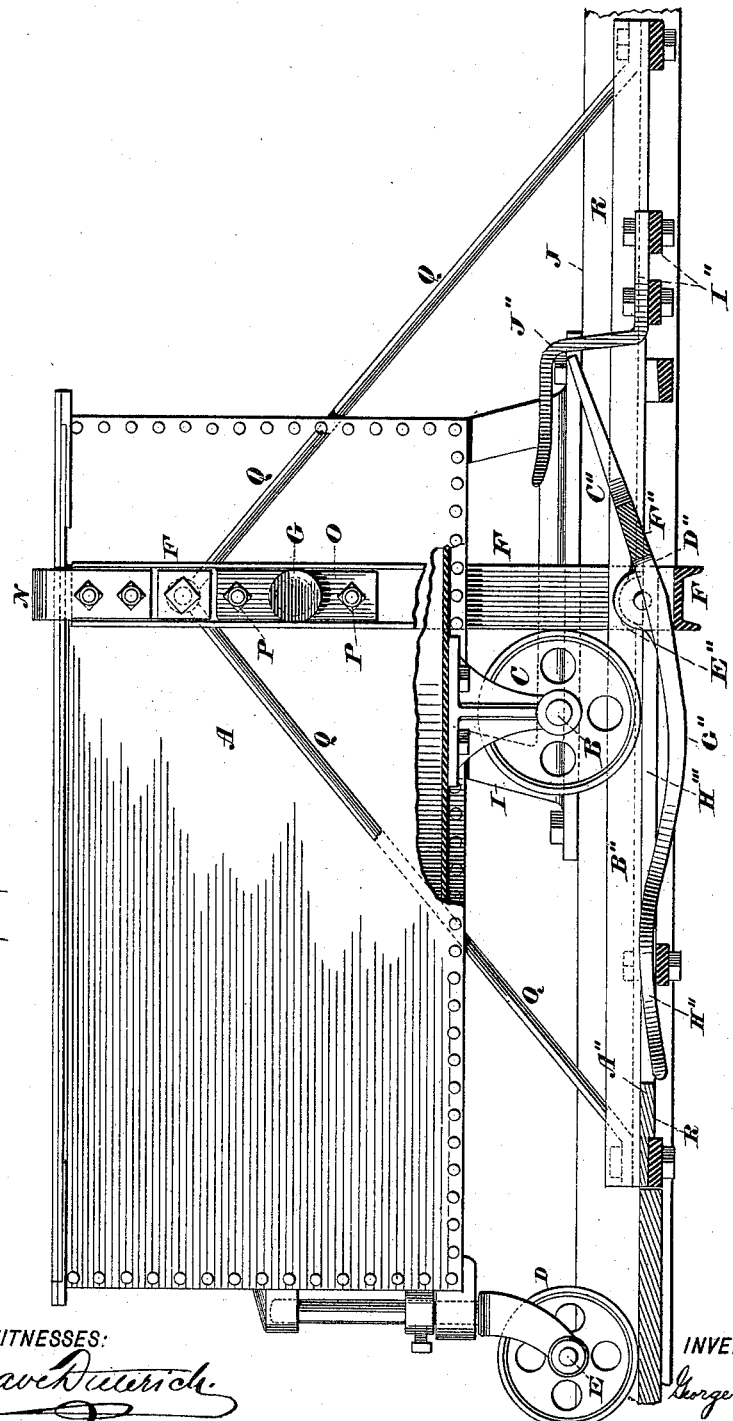

Figure 1 is a side elevation, partly in section on the dotted line 1—1 of Fig. 4, of a machine constructed in accordance with and embodying the invention, the wagon by full lines being shown partly moved home on the platform of the machine, and by dotted lines fully secured upon said platform by arms extending over the rear axle and the exposed ends of the swivel wheel axle. Fig. 2 is a like view of same, looking at the opposite side of the machine, the wagon being partly broken away and the platform being in section on the dotted line 2—2 of Fig. 3. This view, Fig. 2, illustrates the wagon as having partly passed upon the platform and before it has reached the tilting frame thereof by a portion of which the swivel end of the machine becomes finally secured. Fig. 3 is a top view of the platform of the said machine, the wagon by dotted lines being shown in the position it occupies by full lines in Fig. 1, and the side frames or standards of the machine being in section on the dotted lines 3—3 of Fig. 1. Fig. 4 is an end view of the wagon and machine, the supporting side beams being in section on the dotted line 4—4 of Fig. 1; and Fig. 5 is an enlarged detached top view, partly in section, of the main driving shaft and gearing forming a part of the machine and by which the platform carrying the wagon may be inverted and then restored to position.

In the drawings A represents the sugar wagon, which at one end is mounted on the axle B and wheels C and at the other end on the swivel wheel D whose axle E at each end projects beyond the swivel frame, as indicated in Figs. 3 and 4.

The portion of the machine which receives and supports and turns with the wagon consists of the U-shaped frame F and platform R secured to the frame F, while the latter is supported on the trunnions G, G, mounted in bearings provided on the main supporting frames I, I, which are secured to the beams J, J, located at opposite sides of the opening through which the sugar is to be dumped. The frame F is of channel iron bent to form the two sides and base, as shown in Fig. 4. At the upper ends of the sides are bolted the supplemental bars or arms N, having inwardly bent upper ends which extend over and in close proximity to the opposite upper edges of the wagon and serve to aid in holding the wagon during the operation of dumping the latter and returning it to position. The trunnions G, G, are integral with the vertical bars O (shown by dotted lines in Fig. 4) secured to the outer face of the sides of the frame F by bolts P.

At opposite sides of the machine are the diverging braces Q, Q, which at their upper ends are bolted to the sides of the frame F and thence extend downward and outward to the corners of the platform R, where they are securely bolted. The frame F, braces Q and platform R form a rigid durable structure and constitute that portion of the machine which receives the wagon and turns upon the trunnions G, G.

The platform R is oblong in form and adapted to the general outline of the wagon it is to receive, and the said platform is composed mainly of a rectangular iron frame secured upon the base of the frame F and connected at its corners by the braces Q with the upper portion of the sides of said frame. The invention is not especially limited to the particular frame-work of the platform R and this may be varied as desired. The front portion of the platform R will have a flooring A'' of wood or other material, as indicated in Fig. 3, upon which the wagon will be moved, while the rear portion of said platform R may be left open as shown in Fig. 3, if desired. Upon the platform R are securely bolted the converging angle iron guides B'', which, as may be seen in Fig. 3, commence at the outer front corners of the platform R and thence extend rearward and toward each other to the rear edge of said platform. The purpose of the converging guides B'' at opposite sides of the platform R is to guide the wagon centrally upon the platform and upon the wings C'' of the pivoted frame D'', as indicated by dotted lines in Fig. 3. The frame D'' is pivotally secured between the ears E'' bolted to the center of the base of the frame F, and said frame D'' consists of the aforesaid wings C'', the connection F'' intermediate said wings and the tongue G'' which is in line with the longitudinal center of the platform R and is provided upon its front end with the fork H'' whose members are sufficiently separated to receive between them the swivel wheel D and pass over the outer exposed ends of the axle E of said wheel. The flooring A'' of the platform R is recessed or cut away, as illustrated in Fig. 3, to receive the tongue G'', when the latter is in its lower position, indicated in Fig. 2. The relative weight of the parts of the frame D'' at opposite sides of the bearings E'' is such that the normal position of said frame is that indicated in Fig. 2, in which it will be observed that the tongue G'' is resting upon the frame work of the platform within the recess H''' and that the wings C'' are in an upwardly inclined position and extend at their rear ends above the floor of the platform R. When the weight of the wagon comes upon the wings C'' the rear end of the said frame D'' will be depressed to the level of the platform R and the front or tongue G'' of said frame will be elevated to a proper height to pass over the axle E of the swivel wheel D, as illustrated in Fig. 1.

The rear portions of the angle iron guides B'' are connected by the bars I'', and upon these bars are secured the holding bars or frames J'' whose upper portions are elevated to about the level of the upper surface of the rear axle B of the sugar wagon and extend forward toward the front of the platform R. As clearly shown in the drawings, the frames J'' retain the rear end of the sugar wagon upon the platform during the dumping operation by reason of the fact that the axle B passes below said frames and finds a bearing against the rear vertical portion of the same; and the front end of the wagon is held upon the platform at such time by reason of the fork of the tongue G'' being over the projecting ends of the axle E.

The wagon A is pushed upon the platform R with its rear end having the wheels C in advance. If the wagon should not pass upon the platform R on a truly central line, its wheels C will strike against the angle iron guides B'' which will serve to move the wagon to a position centrally upon the platform. The wagon not being on the tracks, and not having flanged wheels adapted to run on the usual tracks, it is necessary to provide some means for so centering the wagon upon the platform R that the rear wheels C will pass upon the wings C'' of the frame D'', and hence the converging angle iron guides B'' have been applied to the platform R. When the wagon A is pushed upon the platform R, the guides B'' will so direct it that its rear wheels C will pass upon the wings C'', as illustrated in Fig. 3, and thereby the front end or tongue G'' of the said frame will be tilted upward to the position illustrated in Fig. 1; and the movement of the wagon inward continuing, the rear axle B will pass below the holding frames J'' and the exposed ends of the axle E will pass below the sides of the fork at the front end of the tongue G'', as shown in Fig. 4 and by dotted lines in Fig. 1. The wagon being thus upon the platform R and held down by the frames J'' and tongue G'', the revoluble portion of the machine, composed of the frame F and platform R, supporting the wagon will be inverted in position for the purpose of permitting the discharge of the sugar from the wagon and then returned to position in order that the wagon then emptied may be withdrawn and a loaded wagon moved upon the platform to be dumped.

The mechanism for dumping the wagon will be described hereinafter and from such description the operation of employing the revoluble portion of the machine will be more fully understood.

The invention is not confined to the special configuration of the frame D'', nor to the particular locations at which the frames J'' and the tongue G'' shall fasten upon the opposite ends of the wagon to prevent its escape from the platform during the dumping operation.

It will be plain from the foregoing description that when the wheels C of the wagon pass upon the wings C'' of the frame D'', the tongue G'' will elevate to engage the front axle E, and that upon the withdrawal of the wagon the wings C'' when released from the wheels C will elevate and the tongue G'' lower to their normal position, which is that illustrated in Fig. 2.

The main supporting frames I, I, will be of suitable form and construction to sustain the trunnions G, G, and furnish bearings for the main driving shaft $a$ and auxiliary shafts $b$, $d$, said shafts being shown in Figs. 4 and 5. In Fig. 1, the shafts $b$, $d$, have been broken away or omitted for clearness of illustration. The main shaft $a$ carries the rigid worm $e$ which is in constant engagement with the gear wheel $f$ mounted on the trunnion G, and hence the revolving motion of the shaft is imparted to said trunnion and by it communicated to the frame F, platform R and wagon A. Upon the shaft $a$ are mounted the loose gear wheel $g$, the loose pinion wheel $h$ and the sliding sleeve $i$ the latter being feathered on the shaft between the said wheels $g$, $h$. The sleeve $i$ has upon its opposite ends the series of arms $j$, the opposite sides of whose ends converge, forming tapered or pointed extremities, and corresponding in outline with the recesses $k$ formed in the sleeve at the base of and between said arms. The sleeve $i$ constitutes the movable portion of the clutch, the other portions thereof being integral with the wheels $g$, $h$, as shown. Those portions of the clutch formed on the wheels $g$, $h$, consist of the series of arms $m$ and recesses $n$, which, as shown in Fig. 5, correspond in outline with each other and with the arms $j$ and recesses $k$ at opposite ends of the sleeve $i$. The arms $j$ are adapted to seat themselves between the arms $m$ of either the wheel $g$ or $h$ according to the direction the sleeve $i$ is moved in making the engagement. The wheels $g$, $h$, being loose on the shaft $a$ and their clutch arms $m$ and recesses $n$ being tapered, it is evident that the clutch arms $j$ of the sleeve $i$ will readily engage the same, since the tapered ends of the arms $j$ moving against the tapered ends of the arms $m$ would move the wheels $g$, $h$ around the shaft sufficiently to permit a full engagement of said arms, or in other words, to permit the ends of the arms $j$ to enter the recesses $n$ and the ends of the arms $m$ to enter the recesses $k$, thus enabling the two parts of the clutch to firmly and fully engage each other at equi-distant points entirely around their circumference and with the minimum extent of movement in the revoluble portion of the clutch. When the sleeve $i$ is caused to engage the gear wheel $g$, the pinion $h$ will be idle, and when the sleeve $i$ is in engagement with the pinion $h$ the gear wheel $g$ will perform no function. The central portion of the sleeve $i$ is provided with the annular groove $q$ receiving the pins $r$ extending inward from opposite sides of the yoke $s$, which is pivoted to the frame I and carries on its upper end the weight $t$. By moving the weight $t$ to either extreme of its travel, as indicated by dotted lines in Fig. 1, the sleeve $i$ will be moved to secure the engagement of the parts of the clutch and said engagement will be maintained until the attendant throws the weight and yoke in the opposite direction, thus disengaging the sleeve $i$ from, say, the gear wheel $g$ and engaging it with the pinion $h$.

I regard the form of the arms and recesses constituting the engaging parts of the clutch as of importance in machines other than those used for dumping sugar wagons and hence this part of the invention is not confined to dumping machines, nor is the dumping machine herein described to be limited to the use of the special form of clutch.

Upon the shaft $b$ are the gear wheels $w$, $x$, the former meshing with the gear wheel $g$ and the latter with the pinion $y$ secured on the shaft $d$; and upon the end of the shaft $b$ is applied an ordinary crank-handle $z$ by means of which the attendant will be enabled to rotate the shaft $b$ and gear wheels $w$, $x$. The shaft $d$ has also secured upon it the gear wheel A' which engages the pinion wheel $h$ on the shaft $a$. Upon power being applied to the shaft $b$ motion will be communicated to the shaft $a$ either through the gear wheels $w$, $g$, or the gear wheels $x$, $y$, A', $h$, according to whether the clutch sleeve $i$ is in engagement with the wheel $g$ or the wheel $h$, and when the shaft $a$ receives its motion through the gear wheels $w$, $g$, it will rotate in one direction, while it will be caused to rotate in an opposite direction when set in motion by the chain of gears $x$, $y$, A', $h$, without any reversal in the direction of movement in the shaft $b$ and crank $z$.

In the use of the dumping machine it may be assumed that the wagon containing its load of sugar has been moved upon the platform R, the axle B of the wagon having passed below the frames J'', the axle E below the fork of the tongue G'' and the upper edges of the wagon beneath the arms N, as shown in Figs. 1 and 2. The wagon being thus wholly supported by the platform R, the clutch sleeve $i$ will be moved to engage the gear wheel $g$ and power will be applied to the crank $z$ whereupon the motion of the shaft $b$ will be imparted through the gear wheels $w$, $g$, and sleeve $i$ to the shaft $a$, and thence through the worm $e$, gear wheel $f$ and trunnion G to the frame F, the result being that the frame F, platform R and the wagon will gradually be inverted in position, the said frame, platform and wagon turning downward at the left hand end of same (looking at Fig. 1) and continuing to revolve until the said wagon has completely or substantially turned upside down, thus permitting the load of sugar to be discharged.

After the sugar has left or while it is leaving the inverted wagon, the attendant will throw the weight $t$ to its opposite position, carrying the clutch sleeve $i$ from the gear wheel $g$ and engaging it with the pinion $h$, whereupon the motion being continued without reversal in the crank $z$ and shaft $b$, the shaft $a$ will through the gears $z, y, A', h$ and sleeve $i$ receive a reverse motion and this motion being imparted to the worm $e$, gear wheel $f$, trunnion G and frame F, the latter with the wagon will gradually retrace its line of travel and return to its former upright position preparatory to the empty wagon being withdrawn from the platform R. Thus it will be noted that the wagon will be inverted and returned while the motion of the crank $z$ and shaft $b$ has not been reversed but continued in the same direction.

While the gear wheels $w, g$, and clutch sleeve $i$ are engaged in inverting the wagon the other gear wheels will be in motion, but perform no function, since the pinion $h$ is loose on the shaft $a$ and will revolve idly thereon; and while the gears $x, y, A', h$ and sleeve $i$ are securing the return of the frame F and wagon A, the gear wheels $w, g$, will rotate but be functionless.

It will be observed that the gear wheels $w, g$, are of the same size, and hence the speed of the shaft $a$ during the dumping of the wagon will be the same as that of the shaft $b$, but during the reverse movement of the wagon to its upright position, the speed of the shaft $a$ will be increased owing to the relative proportions of the gears $x, y, A', h$, and hence the empty wagon will be returned more quickly than it was inverted and much time be saved. The wagons will usually hold about one and one-half tons of sugar and when full, being thus quite heavy, and requiring considerable power to dump them, the movement inverting the wagons will be gradual and slow, but on the return of the empty wagon less power is required and greater speed may with convenience be employed.

The dumping machine above described has been constructed with a view to securing great durability, ease of operation, efficiency and reliability, and the parts of the machine are such that they may be readily understood and put together by the planter and thereafter operated without danger of breakage or necessity for frequent repairs.

The invention is not limited to the special shape of the frames J'', since these may be varied in outline at will, the only essential consideration being that they shall be of such form as to engage the axle B or other available portion of the wagon.

The present application is not limited to the special form of gearing shown for dumping the wagon, and said gearing is not claimed herein. It has been shown and described, however, in order that an operative structure might be presented. The said gearing has been shown and claimed in Letters Patent No. 499,265, granted to George Van Wagenen June 13, 1893, for improvements in machines for dumping sugar wagons. In the said Patent No. 499,265, the frames which hold the wagon upon the platform engage the upper and lower sides of the wheels of the wagon, the latter projecting upward beyond the wagon body in position to be thus engaged. The wagon shown in the said Patent No. 499,265 is what is commonly called a track wagon. The wagon shown in the present application is called a swivel wagon, and the wheels thereof on the rear axle are below the body of the wagon.

What I claim as my invention, and desire to secure by Letters Patent, is—

1. In a machine for dumping sugar wagons and other receptacles, the platform supported upon the pivotally mounted frame, and gearing for effecting the turning of said platform and the dumping of the wagon thereon, combined with the pivotally mounted frame forming a part of said platform and provided at one end with the wings to be depressed by the weight of the wagon and at its other end with the forked tongue adapted when in its elevated position to engage the wagon, and means for holding the rear end of the wagon; substantially as set forth.

2. In a machine for dumping sugar wagons and other receptacles, the platform, pivotally mounted frame supporting the same, and gearing for effecting the turning of said platform, combined with the converging guides at opposite sides of the said platform, means for holding the rear end of the wagon on said platform, and the pivotally mounted frame having at one end the forked tongue adapted to engage the front end of said wagon, and at its rear end being adapted to be depressed by the wagon; substantially as set forth 3. In a machine for dumping sugar wagons and other receptacles, the platform, pivotally mounted frame supporting the same, and gearing for effecting the turning of said platform, combined with the converging guides at opposite sides of the platform, the holding frames at the rear portion of the platform, and the pivotally mounted frame having at one end the wings to receive the rear wheels of the wagon and at its other end the forked tongue adapted when elevated to engage the forward part of the wagon; substantially as set forth.

4. In a machine for dumping sugar wagons and other receptacles, the platform, pivotally mounted supporting frame therefor, the braces connecting the upper portion of said frame with the corners of said platform, and gearing for effecting the turning of said platform, combined with the holding frames at the rear end of said platform and adapted to engage the wagon, and the tilting frame on said platform adapted to be moved by the passage thereon of the wagon, and having at its front end the forked tongue adapted when elevated to engage the forward part of the wagon; substantially as set forth.

5. In a machine for dumping sugar wagons and other receptacles, the pivotally mounted platform having at one end means to engage the wagon, and the pivotally mounted frame on said platform, the said frame at one end having the wings to be engaged and depressed by the passage thereon of the wagon and at its other end provided with the forked tongue which when elevated may engage the forward part of the wagon; substantially as set forth.

6. In a machine for dumping sugar wagons and other receptacles, the pivotally mounted platform having at one end the holding frames J″, J″ and at the other end the flooring, combined with the pivotally mounted frame D″ on said platform, the said frame D″ having at one end the wings to be engaged by the wagon wheels and at its other end the forked tongue adapted when elevated to receive below the same a part of the wagon; substantially as set forth.

7. In a machine for dumping sugar wagons and other receptacles, the pivotally mounted platform adapted to receive the wagon and having means for engaging the wagon at one end, combined with a pivotally mounted frame on said platform, at one end having the forked tongue and at the other end normally projecting upward and adapted to be depressed by the weight of the wagon for the purpose of elevating the said tongue; substantially as set forth.

8. In a machine for dumping sugar wagons and other receptacles, the pivotally mounted platform, the converging guides at opposite sides of said platform and the holding frames at the end of said platform, combined with the tilting frame pivotally mounted upon the platform and having at one end the forked tongue and at the other end normally projecting upward and adapted to be depressed by the weight of the wagon for the purpose of elevating the said tongue; substantially as set forth.

9. In a machine for dumping wagons, the pivotally mounted platform, combined with the pivotally mounted frame thereon, one end of which normally projects upward in the path of the wagon and the other end of which when tilted upward by the weight of the wagon is adapted to engage the latter; substantially as set forth.

Signed at New York, in the county of New York and State of New York, this 29th day of January, A. D. 1895.

GEORGE VAN WAGENEN.

Witnesses:
 CHAS. C. GILL,
 EDWARD D. MILLER.